United States Patent [19]

Tole

[11] Patent Number: 4,902,902
[45] Date of Patent: Feb. 20, 1990

[54] APPARATUS FOR DETERMINING THE THICKNESS OF MATERIAL

[75] Inventor: Walter R. Tole, Chinnor, England

[73] Assignee: Beta Instrument Co., Bucks, England

[21] Appl. No.: 49,235

[22] Filed: May 13, 1987

[30] Foreign Application Priority Data

May 14, 1986 [GB] United Kingdom ............... 8611728

[51] Int. Cl.⁴ .............................................. G01B 11/06
[52] U.S. Cl. ..................................... 250/560; 356/382
[58] Field of Search ............... 250/560, 561; 356/381, 356/382; 364/563

[56] References Cited

U.S. PATENT DOCUMENTS 3,807,870  4/1974  Kalman .............................. 250/560
4,707,611  11/1987 Southwell .......................... 356/382

Primary Examiner—Edward P. Westin
Attorney, Agent, or Firm—Mason, Fenwick & Lawrence

[57] ABSTRACT

A glass plate thickness measuring instrument wherein a beam of radiation is impinged on the glass to provide a pair of beams reflected from the front and back surfaces of the glass plate respectively. The two beams are made to fall on a radiation responsive device in the form of a charge coupled device, which provides pulsed image outputs of the beams in the form of staircase waveforms of a truncated Gaussian distribution. Electronic circuity, including a microprocessor, is employed to calculate the center of gravity of an area under both waveforms above a threshold value, and the distance between the respective centers of gravity calculated to provide a measure of the thickness of the material.

7 Claims, 5 Drawing Sheets

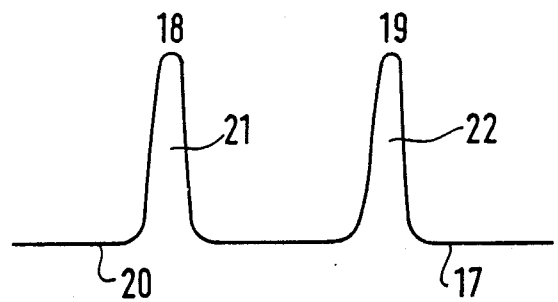
FIG.3.
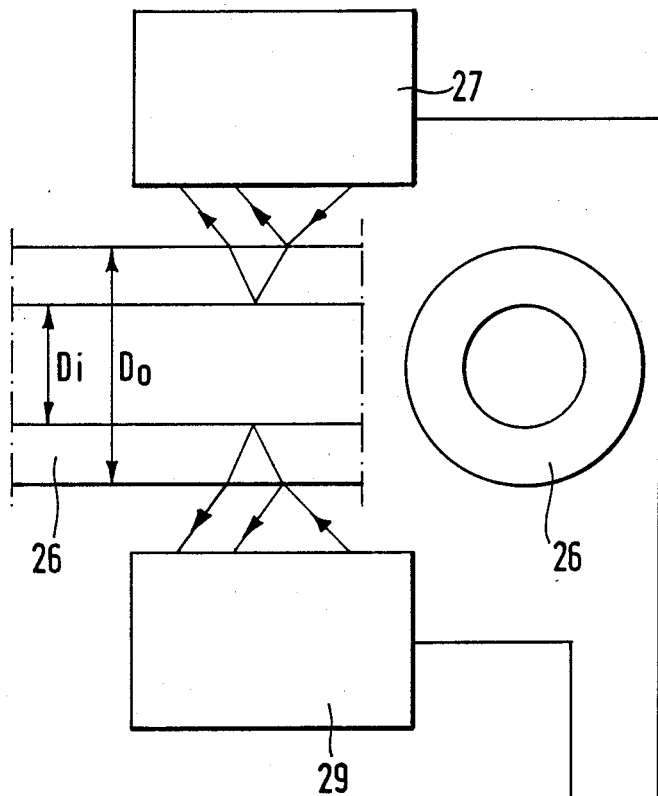
FIG.4.
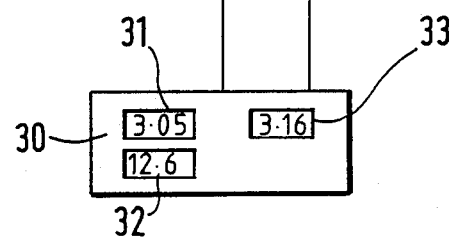

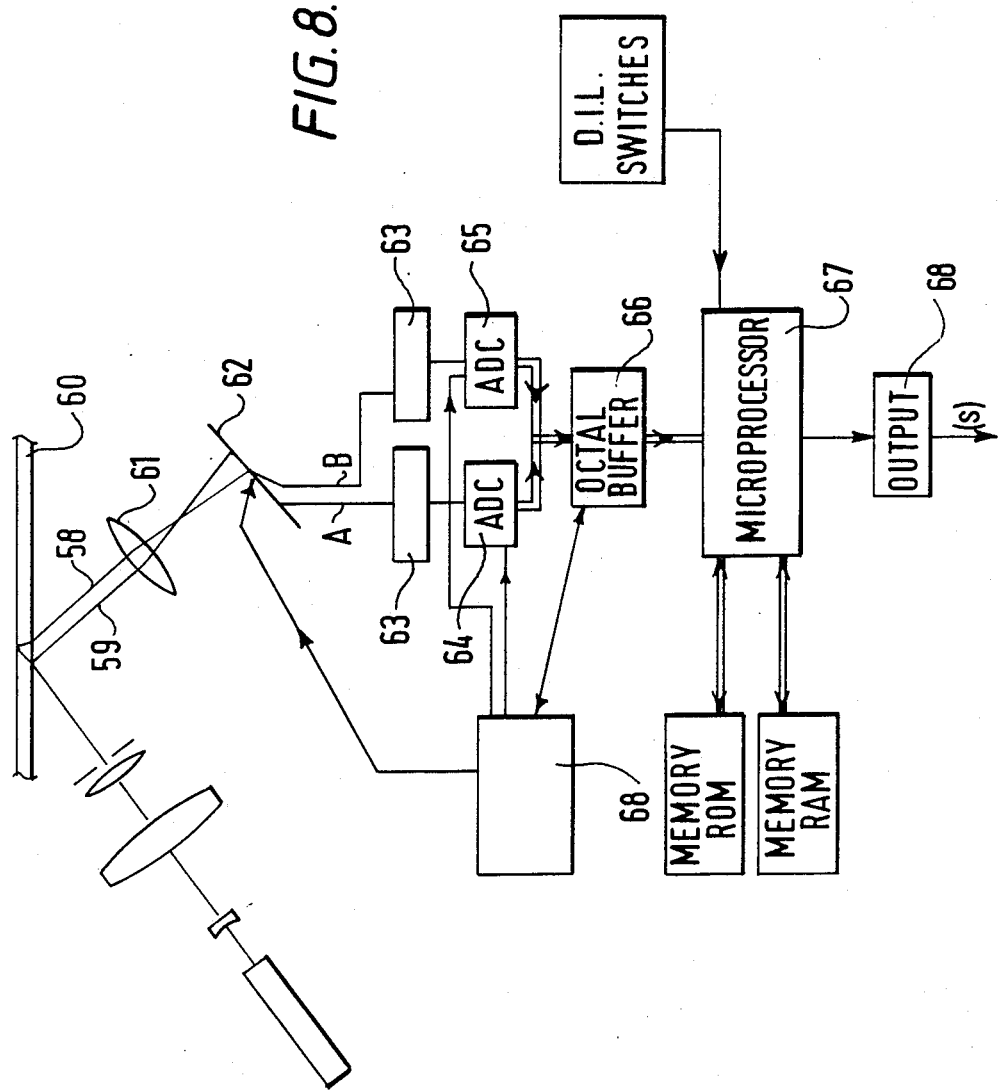

APPARATUS FOR DETERMINING THE THICKNESS OF MATERIAL

FIELD OF THE INVENTION

The present invention relates to a method and apparatus for the non-contact measurement of the thickness of a material such as glass plate or tube, which is inaccessible during production by virtue of its high temperature (say 500° C.) thus precluding the use of a conventional contact method of measurement.

BACKGROUND OF THE INVENTION

In the manufacture of glass, the constituent materials required to form the glass are raised to a high temperature in a furnace. The materials are combined, in a molten state, and the resultant glass product is, in effect, a super cooled liquid.

In the molten state, the glass temperature is in the range of 1,000° to 1,500° C. and flows fairly freely. It is in this state that it may be formed into bottles, vials, and tubes for use in fluorescent lighting, medical pipettes, surgical instruments, rods or lenses for optical instruments as well as glass sheets or panes for domestic, industrial and automotive applications. Specialist glass may be formed and ground into optical elements for use in telescopes, cameras and other types of photographic equipment.

The present invention is particularly directed to the measurement of thickness of glass, be it in sheet, tube or rod form, as the thickness becomes critical from the view point of meeting a particular specification in terms for example of maintaining safety standards with respect to its application.

In a typical glass works, the molten glass is extruded in a vertical or horizontal line either in sheets, tubes or rods. It is at this stage that measurements are required to be performed on the molten product such as thickness, diameter or wall thickness as the case may be. The range of thickness primarily at issue with regard to the present inventive technique would be in the order of a few microns up to 50 mm, although the invention disclosed herein is not to be taken to be limited to this narrow field of application.

The idea of measuring the thickness of a transparent material by determining the separation between the images or beams reflected from the front and rear surfaces of the material as the result of the impingement of a single beam of light directed at an angle of incidence onto the front face, wherein the separation is a measure of that thickness, is already known.

In particular a thickness measuring apparatus designed for this purpose is disclosed in U.S. Pat. No. 3807870.

This prior system employs the use of an array of closely spaced light sensors which are arranged to intercept the reflected beams, the distance between selective ones of the sensors receiving the beams being taken as a measure of the thickness of the material.

The light sensors, preferably in the form of photodiodes, are of extremely small dimension and produce electrical signals in accordance with the amount of light they receive from each reflected beam.

A scanning detector is employed electronically to scan the array and a trigger voltage is produced each time the signal exceeds a given threshold value. Thus a pair of trigger signals are produced during each scan and the time interval between the signals is used to determine the thickness of the workpiece.

This prior system has not proved entirely successful mainly because of its inability to provide the accuracy of measurement required in many applications in the field.

SUMMARY OF THE INVENTION

It is an object of the invention to overcome the disadvantages of the prior art and to provide thickness measuring apparatus which is able to determine the thickness of a transparent workpiece to a high degree of accuracy and more inexpensively, due to its construction, than with the known systems.

According to the invention there is provided apparatus for determining the thickness of a transparent workpiece comprising a source of radiation, means for directing a beam of radiation from said source to impinge on said workpiece to produce a first reflected beam from a front surface of the workpiece and a second reflected beam from the back surface of the workpiece at a spacing therebetween, radiation responsive means in the path of said two beams and providing respective pulse wave outputs representative of the distribution of radiation falling on said radiation responsive means, and means for determining the center of gravity of an area under each said pulse, the relationship between which centers of gravity provides a measure of the thickness of the material.

In contrast to the prior known system referred to herein, since each reflected beam image is analyzed with respect to the mean distribution of radiation in an output pulse, a much more accurate determination of workpiece thickness becomes possible.

Other features and advantages of the present invention will become apparent from the following description of preferred embodiments of the invention taken with reference to the accompanying drawings.

BRIEF DESCRIPTION OF THE DRAWINGS

FIG. 3 is a representative waveform trace of the output from the instrument of FIG. 2;

FIG. 4 is a schematic diagram of another embodiment of thickness measuring instrument according to the invention;

FIG. 8 is a block diagram of an electronic measuring system for use with the measuring instrument of the invention.

BEST MODES OF CARRYING OUT THE INVENTION

Figure 1:
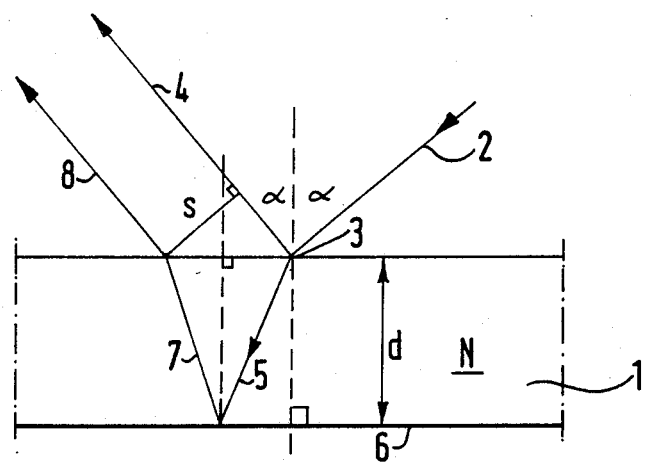
FIG. 1 illustrates how a beam of light directed at incidence onto a glass plate is split to provide a first reflected beam from the front surface and a secondary reflected beam from the back surface of the plate.

Before entering into specific detail concerning preferred ways and means of putting the invention into effect, it would be helpful to consider some basic optical theory with reference to FIG. 1.

If a ray of light 2 falls on the face 3 of a glass plate 1 of thickness 'd' at an angle of incidence α to the normal N, then a little of the light will be reflected as ray 4, and a portion will be refracted in the glass as ray 5. The refracted rays will undergo internal reflection 7 from the opposite face 6 of the glass 1 and emerge from face 3 as ray 8 parallel to and spaced a distance S from ray 4.

In effect the glass plate 1 acts to split the incoming beam 2 resulting in a double reflected image 4 and 8 of the incoming beam 2.

It can be shown by simple mathematics that the thickness of the glass plate 'd' is given by:

$$d = \frac{s\sqrt{n^2 - \sin^2\alpha}}{\sin 2\alpha} \quad (1)$$

where

's' is the perpendicular separation between the reflected ray 4 and the second reflected ray 8, and 'n' is the refractive index of the material of the glass.

Figure 2:
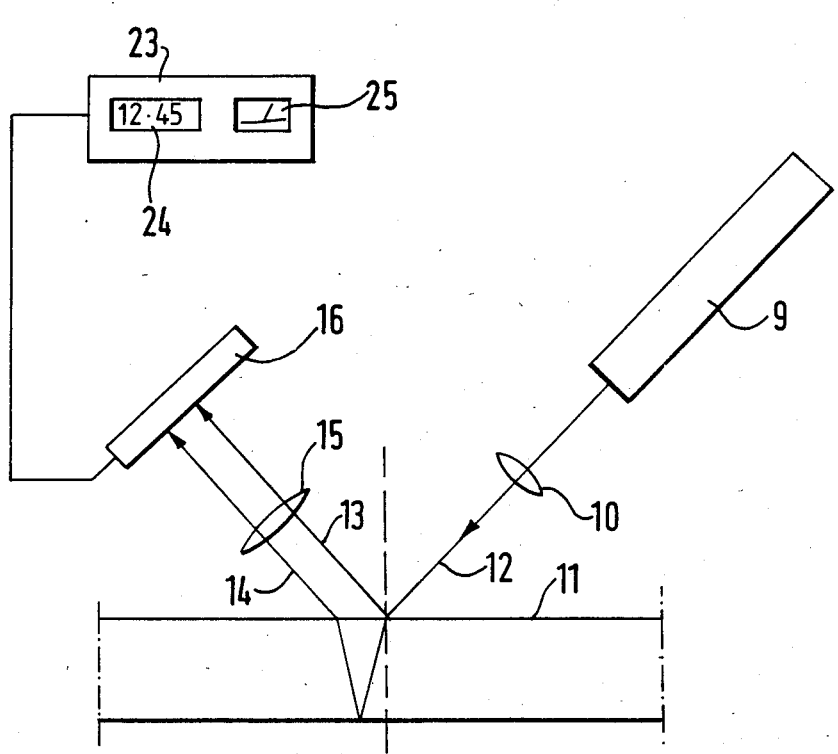
FIG. 2 is a schematic diagram of one embodiment of thickness measuring instrument according to the invention.

Measuring apparatus according to one embodiment of the invention utilising this beam splitting effect to determine the thickness of glass plate, is shown in FIG. 2. It comprises a laser tube 9 which emits a fine beam of light 12. The beam 12 is conditioned through a lens system 10, and brought to focus on the surface of a glass plate 11 at such an angle of incidence that part of the beam 12 is reflected as beam 13 and part of it will be refracted into the material and subsequently emerge as a secondary reflected beam 14 parallel to beam 13.

The beams 13 and 14 are focussed by lens 15 onto a diode array 16. The diode array 16 consists of closely positioned opto-electronic elements providing electrical outputs proportional to the intensity of light falling on the respective elements in the array.

The elements in the array 16 are closely positioned to the extent for example of having 2,400 elements in a rectilinear array of 24 mm.

The output of the linear diode array 16, may be viewed on an oscilloscope wave trace 17 of light intensity as a function of beam position across the array as shown in FIG. 3.

It will be observed that the waveform trace has two peaks 18 and 19 and a trough level 20.

The waveform trace is representative of the light distribution across the array 16 between and to either side of those diodes receiving the full intensity of the beam 13 and 14 corresponding to their respective central axes.

If the distance between the beams 13 and 14 is determined, it becomes possible, accurately, to calculate the thickness 'd' of the material in question.

The optimum way to accurately determine the distance between the beams 13 and 14 is to find, by calculation, the center of gravity of the areas 21 and 22 above a predetermined threshold value, and determine electronically their distance apart which will then provide an accurate measurement of distance 's', and from this the thickness of the material in question.

In the FIG. 2 embodiment the output from the diode array 16 is fed into an indicator unit 23. The indicator unit 16 is adapted to calculate first the center of gravity of each of the areas 21 and 22 with respect to a threshold value of light intensity, and then compute electronically the thickness of the material 'd' which is displayed directly in mm on a digital readout 24.

By presetting a required thickness 'd', a continuous deviation 25 of the material thickness may be displayed on the same instrument and appropriate corrections made to the line equipment as required.

The method and apparatus described above for measuring thickness of glass plate may equally well be applied to the measurement of wall thickness of glass tubes. This is exemplified in FIG. 4. Here a measuring head 27 containing a laser tube, optics and diode array of the type shown in FIG. 2, is mounted at some distance from a glass tube 26. A second head 29 equivalent to head 27, is mounted diametrically opposite the tube 26 performing a similar measurement on the other side of the tube. By combining the outputs from heads 27 and 29 in an electronic indicator unit 30, it is possible to determine the wall thickness of glass on two opposite sides on digital displays 31 and 32.

Subsequently by means of electronic calculation within the instrument 30 the overall diameter $D_o$ of tube 26 may be displayed on a digital display 33, as well as the inner diameter $D_i$ of the tube 26.

Figure 5:
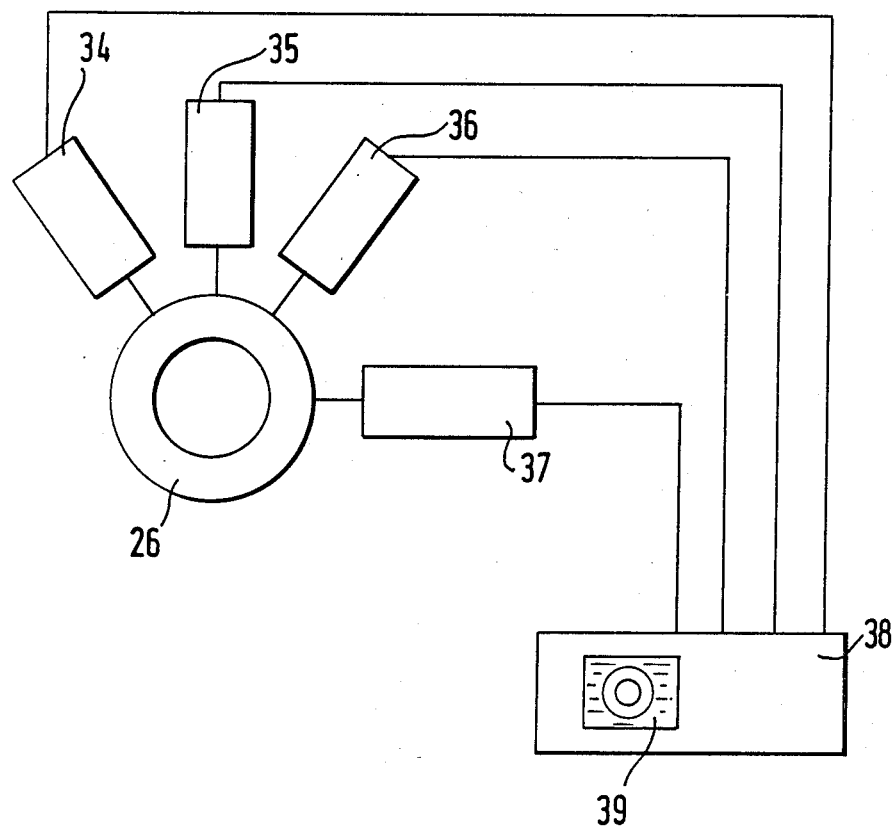
FIG. 5 is a schematic diagram of a further embodiment of a thickness measuring instrument according to the invention.

As a further extension of this invention, (see FIG. 5), it is possible to install several optical heads 34, 35, 36 and 37 around the periphery of tube 26. The output of these heads is fed into one central indicator or computer bank 38 and, by scanning at various points around the tube 26, the overall wall thickness of tube 26 may be determined by employing a CRT (cathode ray tube) 39 providing in graphic display, the exact cross-section and dimensions of the glass tube 26.

Figure 6:
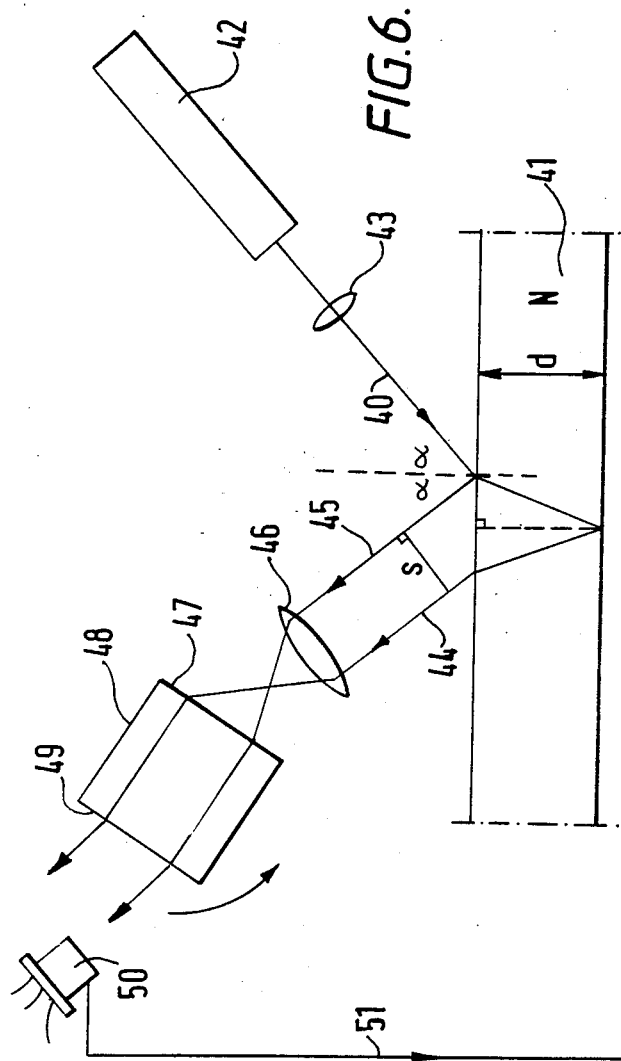
FIG. 6 is a schematic diagram of another embodiment of a thickness measuring instrument according to the invention.

A further embodiment of the invention is shown in FIG. 6. In this embodiment a laser beam 40 is projected onto the surface of a glass product in the form of a glass sheet 41, the laser beam being emitted from a laser source 42 through an optical lens system 43 which shapes the beam 40 into the required format.

Spaced beams 44 and 45 emerge from the plate 41 after reflection and internal refraction and reflection. The beams 44 and 45 are projected through an optical system 46 onto the face 47 of a square transparent prism 48 rotating about its central axis. The beams 44 and 45 are subsequently refracted through the material of the prism, and emerge from face 49.

As the prism 48 rotates the beams 44 and 45 are scanned effectively past a photocell 50 which produces an electrical output 51.

Figure 7:
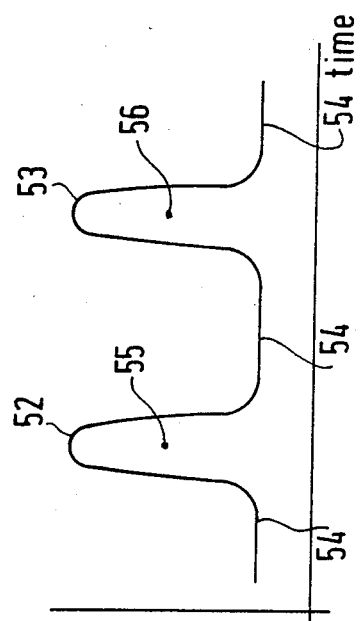
FIG. 7 is a representative trace of the output from the instrument of FIG. 6.

The output of photocell 50 may be represented graphically on an intensity/time curve 52 as shown in FIG. 7, the two peaks 52 and 53 of which represent the output of the photocell 50 during the time the beams 44 and 45 are projected past it.

The intensity of the wave form in the troughs 54 is low or near zero, which represents the period at which there is no light falling on the photocell.

The output 51 of the photocell 50 is fed into an electronic indicator/controller 57 which is adapted to process the photocell output electronically to determine the centers of gravity 55 and 56, with respect to predetermined threshold values, of FIG. 7, of the areas underneath the curve, which is a function of the distance between the beams 44 and 45 from which the thickness of the glass plate may be calculated.

In a similar way as described earlier herein with reference to FIG. 4, a number of these units operating on this principle may be used to measure the thickness of the glass sheets or tubes.

An electronic circuit, depicted in block form for purposes of illustration, for calculating the center of gravity of the areas under the pulse wave outputs obtained from the measuring instruments above described is shown in FIG. 8.

The split beams 58 and 59 emerging from the workpiece 60 are focussed by lens 61 onto a charged coupled device (CCD) 62 as shown, forming two corresponding images.

Because of defraction effects, these images are not infinitely narrow lines but have some width. In practise they are about 6 pixels wide and are of staircase forms of a truncated Gaussian distribution.

The CCD 62 has two analogue outputs A and B, channel A for odd numbered pixels, and channel B for the even numbered pixels.

The outputs A and B are connected via analogue circuits 63 to two analogue-to-digital convertors 64 and 65 which convert the outputs to 8-bit parallel binary outputs.

The convertors 64 and 65 alternatively drive the inputs of an octal buffer 66. A microprocessor 67 reads the octal buffer.

Specially designed control logic 68 detects each read operation of the microprocessor and provides the required control signal to the convertors 64, 65 and to the CCD 62. The value of each analogue electrical signal is important only at certain times when the respective convertors 64 and 65 sample it.

The microprocessor 67 notes the value of the peak of each pulse (brightness or brightest part of the impinging beam) and the value of the background signal of nearby pixels.

The microprocessor 67 then calculates a threshold, and the average position of the area under the pulse which is above the threshold, giving each pixel a statistical weighting corresponding to its height above the threshold.

The microprocessor 67 calculates another threshold for the other pulse and repeats the above calculations as for the first pulse.

In this way, the positions of the two pulses representing the split beam images 58 and 59 are determined, and the microprocessor 67 is able to calculate the distance 's' between their positions in arbitrary units.

The microprocessor 67 reads the calibration setting on the dual-in-line switches 68 and then calculates the distance 's' in units of 1 micron or 1/10 micron or in whatever units are required which appears at the output 68.

It then becomes possible to calculate the thickness of the workpiece from the information thus obtained and from the known refractive index of the glass and angle of incidence by using equation (1) previously referred to in this disclosure.

Glass manufacturers usually know the refractive index sufficiently accurately. The angle of incidence of the primary beam, be it from a laser source or other, is known because it is part of the design of the instrument and can be chosen so that slight errors in it have a negligible effect on the result.

By virtue of the method described above a more accurate determination of glass wall thickness is possible than with prior systems which assume that the two pulses have the same size and shape as each other. This assumption is incorrect.

The brightness of the two reflected sheets of light can differ for various reasons:

1. If the glass is a tube, the two surfaces have different radii of curvature so they reflect different amounts of light into the gauge so.
2. If the glass has much less than 100% transmission.
3. Dirt and scratches affect the brightnesses.
4. If one surface is better in focus than the other because of its curvature or position.

The sensitivity of the various pixels in the CCD 62 varies from pixel to pixel. So, if the threshold used is similar to the brightness at a pixel on the leading edge of either pulse, an error of a whole pixel can result from this variation in sensitivity. This error is much reduced by the applicants' method of finding the average position of the various pixels in the pulse. Irregularities in the optical flatness of the window on the CCD, dirt and other defects in the optics and optical interference effects can produce similar greater errors. These errors are also greatly reduced by the averaging method herein disclosed.

What is claimed:

1. Apparatus for determining the thickness of a transparent workpiece comprising a source of radiation, means for directing a beam of radiation from said source to impinge on said workpiece to produce a first reflected beam from a front surface of the workpiece and a second reflected beam from the back surface of the workpiece at a spacing therebetween, radiation responsive means in the path of said two beams and providing respective pulse wave outputs representative of the distribution of radiation falling on said radiation responsive means, and means for determining the center of gravity of an area under each said pulse, the relationship between said centers of gravity providing a measure of the thickness of the workpiece.

2. Apparatus as claimed in claim 1 wherein said radiation responsive means is a charge coupled device.

3. Apparatus as claimed in claim 2 wherein said determining means includes microprocessor means for computing the average position of the various pixels of said charge coupled device in the respective pulses to determine said centers of gravity, the distance between said centers of gravity being a measure of the thickness of the workpiece.

4. Apparatus as claimed in claim 3 wherein said microprocessor means is adapted to compute a threshold value, said area under each pulse being above said threshold value, which value is different for each said pulse.

5. Apparatus as claimed in claim 4 wherein said microprocessor provides an output representative of the distance between said center of gravity of each pulse, and indicating means adapted to calculate and display workpiece thickness using the output of said microprocessor means.

6. Apparatus as claimed in claim 1 wherein said radiation source is a laser source.

7. Apparatus as claimed in claim 1 wherein said source and radiation responsive means are arranged in an optical housing and wherein, to measure the thickness of a workpiece in the form of glass tubing, a said optical housing is provided at the respective ends of a diameter of the tubing to determine wall thickness of the tubing at opposite sides thereof.

* * * * *